United States Patent
Gore

[15] 3,664,915
[45] May 23, 1972

[54] SEALING MATERIAL

[72] Inventor: Wilbert L. Gore, Newark, Del.

[73] Assignee: W. L. Gore & Associates, Inc.

[22] Filed: Oct. 3, 1969

[21] Appl. No.: 863,446

[52] U.S. Cl.............................161/164, 161/165, 161/180, 161/189, 161/402, 161/411, 264/127, 264/288
[51] Int. Cl..................B29d 7/24, B32b 27/02, B32b 27/32
[58] Field of Search.................161/164, 165, 178, 180, 189, 161/402, 411; 264/127, 288, 289

[56] References Cited

UNITED STATES PATENTS

| | | | |
|---|---|---|---|
| 3,002,770 | 10/1961 | Chesnut et al. | 285/94 |
| 3,260,774 | 7/1966 | Harlow | 264/127 |
| 3,295,166 | 1/1967 | Owings | 264/127 |
| 3,315,020 | 4/1967 | Gore | 264/127 |
| 3,454,455 | 7/1969 | Rasmussen | 161/402 |
| 3,461,199 | 8/1969 | Campbell | 246/289 |
| 3,490,986 | 1/1970 | Ahrabi | 161/189 |
| 3,503,836 | 3/1970 | Rasmussen | 161/402 |

Primary Examiner—John T. Goolkasian
Assistant Examiner—George W. Moxon, II
Attorney—C. Walter Mortenson

[57] ABSTRACT

Polymers of tetrafluoroethylene are converted into shaped articles which have a uniform cross-section along one axis, such as ribbons or sheets, which are then processed to produce a fibrillated expanded material. An expanded article or material of this invention is one which has been processed to produce a new article or material of the same uniformity and cross-section shape as the former, but having a lesser specific gravity than it possessed initially. The term "expanded" as defined herein means lesser specific gravity. In producing the articles of this invention, the fibrillar structures of the molecules within the article are expanded under conditions in which the article is stretched without causing significant decreases in the width or the thickness of the article. In so doing, the specific gravity of the resulting article is substantially and valuably decreased. Less of the material is needed in effecting formations of seals such as used in the formation of pipe joints. The resultant materials are advantageously less slippery and more self-cohesive than the initial material. Further, they are more readily handled and can be used with ease at low temperatures.

9 Claims, 1 Drawing Figure

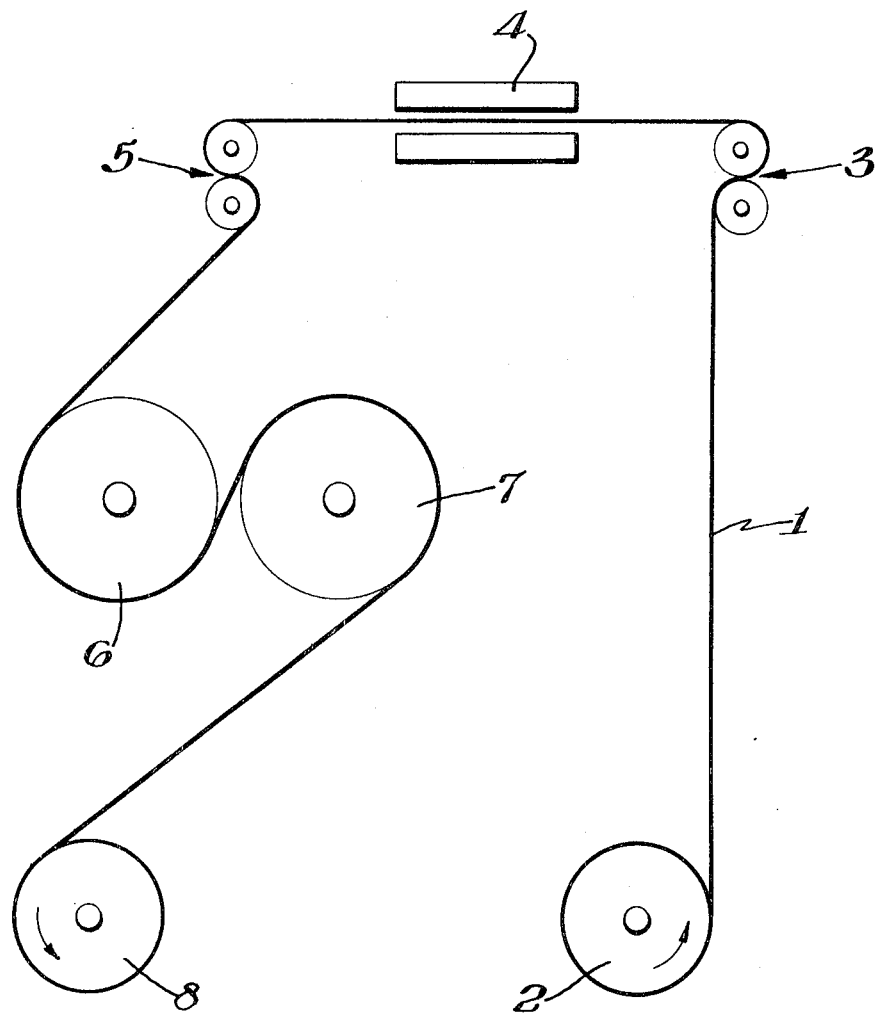

SEALING MATERIAL

This invention relates to a polymer of tetrafluoroethylene used in strip, pellicle or ribbon form to seal threaded joints so that they will keep fluids which are under pressure without leaking. U.S. Pat. No. 3,002,770 describes a method of using unsintered strips of such polymers for sealing threaded joints, and it also outlines a process for manufacturing such strips. My Canadian Pat. No. 926,566 and U.S. Pat. No. 3,315,020 also describe methods for manufacturing poly(tetrafluoroethylene) ribbons.

The strips or tapes manufactured by these processes provide very good seals for threaded joints, but they are difficult to use because the tapes are very slippery. Further, they have poor adhesion to themselves where overlapped, and they are rather stiff and difficult to make conform to the profile of threads so that the joint can be screwed together. These difficulties become serious when making seals outdoors in cold weather (say, freezing temperatures) or when working with fine, close-fitting threads. These difficulties are so serious that poly(tetrafluoroethylene) tape is seldom used under these conditions. Also, the poly(tetrafluoroethylene) material used in these tapes is very expensive. For example, one such polymer used for this tape currently sells for $4.65 per pound in powder form, the tape cost being, of course, even higher.

An object of this invention is to provide a poly(tetrafluoroethylene) tape that has a higher coefficient of friction, better self-adhesion, and improved conformability to thread profile than the tapes currently being used. A further aim is the provision of a method and an apparatus for making such a tape. A still further goal is making a tape that can be used in lesser amounts and yet provide seals comparable to those obtained by the conventional tapes.

These and other objectives will be seen by reference to the description below and to the drawing, all of which is given for illustrative purposes only and is not limitative.

The drawing is a schematic showing of an apparatus that can be used in making the tapes of this invention.

This invention accomplishes the above objectives with less of the expensive poly(tetrafluoroethylene) resin and does so with no loss of the excellent sealing quality of the tapes. In accomplishing this, unsintered poly(tetrafluoroethylene) ribbons are stretched lengthwise up to more than a twofold increase in length but with little narrowing of the sheet and no measurable loss in thickness, thus being uniaxially expanded and oriented. This process expands the fibrillar structure (see U.S. Pat. No. 3,315,020 for a discussion of fibrillar structure) of the sheeting so that the density of the resulting product is substantially decreased. Also, the material becomes less slippery, more self-cohesive when overlapped and pressed together, and more easily formed to fit the profile of the threads about which the tape is to be wrapped in effecting the seal.

If poly(tetrafluoroethylene) ribbon is expanded by stretching at normal temperatures, it suffers an elastic retraction when released from tension. This is undesirable from commercial considerations, because the tape is sold in specified lengths. Further, when the tape is wound on cores in packaging it for sale, the elastic tension accumulates and cores collapse. Still further, the tape becomes difficult to unwind due to self-adhesion on the tightly wound roll which adhesion results from the elastic retraction. In the process of this invention, this strain relaxation is eliminated by carrying out the expansion or stretching at high temperature in the range of 300° C., or by raising the temperature of the expanded ribbon while it is held so it cannot retract, and holding it under these conditions until the stress decays.

The detailed description of the process for expanding the structure is provided in the Figure. Poly(tetrafluoroethylene) ribbon 1, approximately 6 inches wide, is drawn off from source 2 by two rubber coated pinch rolls 3. These actually need not touch each other, and generally they are so adjusted to pull tape 1 from source 2 without causing it to lose in thickness. The tape is then passed between two close-spaced heater platens 4, where it is heated to between 200° C. and 300° C. following which it is passed through two silicone-rubber rolls 5. These are driven at a higher peripheral speed than rolls 3, thereby effecting the desired stretching. The stretched tape is then passed around drum 6 that is heated to a temperature above 200° C., but below the 342° C. melting temperature of unsintered poly(tetrafluoroethylene). The hot tape then passes around cooling drum 7, and is finally rewound on 8 which is driven at low torque by a slip clutch (not shown for convenience). Drums 6 and 7 are rotated at the same peripheral speed as rolls 5. They are not pinch rolls, though they may be in close proximity with each other. The stretching between pinch rolls 3 and draw rolls 5 is controlled by suitable gear adjustments in their drive mechanisms (not shown for convenience), using a common driving device for both sets of rolls, as well as for drums 6 and 7.

Although the expansion between pinch rolls 3 and draw rolls 5 can be carried out at room temperature, improved uniformity of operation is obtained if the sheet is heated by platens 4 during this expansion and greater degrees of expansion are feasible. If the poly(tetrafluoroethylene) ribbon is heated by these platens to a temperature above 200° C. and preferably to about 300° C., the stress-relieving treatment by drum 6 frequently is not used and is not necessary if the speed of the tape is sufficiently slow. However, greater speed of operation is obtained using drum 6 and for that reason use of the hot drum 6 is preferred. After the expanded poly(tetrafluoroethylene) ribbon has cooled, it is slit to required widths and wound on cores. There is very little, if any, retraction and the resultant wound cores do not collapse, nor does the tape self-adhere.

This invention is further illustrated in the examples below which are illustrative only and not limitative.

EXAMPLE I

A large roll of unsintered poly(tetrafluoroethylene) ribbon approximately 6 inches wide and 0.003 inches thick was placed in the apparatus of the Figure as source 2, and the tape 1 was passed into the apparatus with rolls 3 rotating at a rate of 30 feet per minute. The heater platens 4 were heated to 300° C., while stress-relaxation drum 6 was held at 310° C. and cooling drum 7 was at about 25° C. Different amounts of expansion were effected, and in each case the given expanded tape collected at wind-up 8 was tested.

In effecting three different expansions, three different gear changes were used to increase the peripheral rates of rolls 5, 6, and 7 over that of pinch rolls 3 successively to 35.2, 39.0, and 49.5 feet per minute producing material where the length increase was 18, 30, and 65 percent, respectively, Properties of the original material plus the three sets of expanded material are given in Table I, being Items 1 through 4:

TABLE I

| | Avg. thickness | Specific gravity | Coef. of friction | Gms./sq. in. self adhesion | Percent thread conform. | P.s.i. long. tensile | Percent long. elon. | P.s.i. lateral tensile | Ft. lbs. torque to seal 1,500 p.s.i. |
|---|---|---|---|---|---|---|---|---|---|
| 1. Not expanded | .0031" | 1.49 | .29 | 33 | 12.6 | 1,525 | 115 | 130 | 17 |
| 2. 18% expanded | .0031" | 1.29 | .91 | 42 | 16.0 | 1,360 | 83 | 68 | 14 |
| 3. 30% expanded | .0031" | 1.17 | 1.09 | 110 | 19.1 | 1,340 | 84 | 66 | 21 |
| 4. 65% expanded | .0030" | .93 | 1.34 | 175 | 29.2 | 1,340 | 97 | 52 | 20 |

With reference to Table I, the thickness was measured with a dial micrometer capable of reading 0.00005 inch. Two standard-error ranges (95 percent confidence range) for the averages of thickness in the table are ±0.00012.

Specific gravity was measured on strips one-half inch wide cut from the ribbons. The thickness, width, length and weight of the strips were measured on duplicate strips. 95 percent confidence range for this measurement is ±0.015.

Coefficient of sliding friction was measured by fastening a strip of the sheet as a cover on an aluminum plate 20 inches long and fastening another strip of the same sheet as a cover to the bottom surface of a steel block one-half inch wide, 2 inches long, weighing 47.7 gms. The angle of inclination of the plate required to keep the steel block sliding was determined. Four measurements were made on each of the four materials. Fresh sheeting was placed on the plate and block for each of the trials, because it was found that the tape became more slippery due to the rubbing of the surfaces together. The measurements in the table are for poly(tetrafluoroethylene) against poly(tetrafluoroethylene). No significant difference was found in slide angles when using an uncovered steel block (smooth steel against the tape). The coefficient of fraction given in Table I is given by the tangent of the angle of inclination of the plate required to keep the block sliding. The 95 percent confidence range for the tabulated coefficients of friction is about ±0.05.

The self-adhesion measurements were made by taking two 1 inch by 1 inch squares of the sheet, anchoring them to two separate wooden blocks using two-sided adhesive tape placed between the block and the sheet, and then pressing the two squares of sheet together by placing one block on top of the other with the sheets in contact and placing on the top block a 20 lb. weight for 3 minutes. The weight, in grams, required to separate the two poly(tetrafluoroethylene) squares thus pressed together was measured, the tabulated figures being the average of six trials for each kind of sheet. The 95 percent confidence range for the tabulated self-adhesion values is about ±6 gms. for self-adhesion at the 30 gm. level to about ±20 gms. at the 150 gm. level.

Thread conformability measurements were made by forming a loop form a ½ inch wide, 10 inch long strip of the given tape and hanging it over the threaded end of a standard ½ inch pipe and then hanging a 464.5 gm. weight on the loop so that tape resting on the threads was pulled against the thread profile with this weight. The depth of depression of the tape from the points over the ridges of the thread to the points over the trough of the threads was measured by a horizontally mounted microscope with a reticule marked in 0.001 inch divisions. Four different strips were measured from each kind of poly(tetrafluoroethylene) sheet. The depth of the thread groove was 0.050 inch at the points where the depth-of-depression was measured, and the "percent conformability" was calculated by dividing the depression depth of the sheeting by 0.050 and multiplying by 100. The 95 percent confidence range of the tabulated figures for percent conformability is about ±1.5 percent.

Measurements of tensile strength and elongation were made on an "Instron" type test instrument. Only the drop in tensile strength transversely across the expanded ribbon is statistically significant. The transverse elongation of all four kinds of ribbon was greater than 500 percent, the maximum measurable with the set-up used, and the longitudinal elongations were all significantly greater than 50 percent.

The torque-to-seal measurements were made using standard ½ inch pipe fittings. The external threads of five plugs were each wrapped with a ½ inch wide strip of the tape to be tested, using the procedure described in U.S. Pat. No. 3,002,770. A manifold having five inlets for joint formation was connected to a nitrogen gas cylinder, and one of the plugs covered with an identified tape was screwed into the inlet until it was finger tight. The manifold was then pressured to 1,500 psi, and the plug was then tightened with a torque wrench calibrated in 1 ft. lb. divisions. Each plug was tightened by 1 ft. lb. increments and tested for leaks by submerging the manifold in water. The joint was considered sealed when no gas bubble appeared in 30 seconds. The 95 percent confidence limit for the tabulated average torque-to-seal measurements is about ±6 ft. lbs. None of the differences is statistically significant.

In order to determine if there were significant torque differences between the expanded and nonexpanded material, the nitrogen pressure of the sealing tests was increased to 2,000 psi and 15 measurements made of the torque-to-seal using the nonexpanded material and 15 measurements using the 65 percent expanded material:

|  | Average Torque | Standard Deviation |
|---|---|---|
| Non expanded | 27.7 ft. lbs. | 6.6 |
| 65% expanded | 27.2 ft. lbs. | 7.1 |

The difference in torque required to seal the ½ inch pipe plugs against 2,000 psi nitrogen pressure is not significantly different. Thus, the tapes of this invention are as effective in forming seals as the nonexpanded, prior art tape.

The expanded materials were found to be less slippery, to have higher self adhesion, to conform better to thread profiles, and to retain the excellent sealing qualities of the nonexpanded material.

It was also found that the 65 percent expanded material could be expanded a second time for an additional 65 percent expansion or a total length increase ratio of 1:2.72. However, great care was necessary to obtain a uniformly expanded material at these very great expansion ratios. Materials with a specific gravity below 0.5 have been prepared by repeated expansion processes. Such uniformly expanded materials can be used as sealants in compression seals.

EXAMPLE II

Some of the same roll of unsintered poly(tetrafluoroethylene) used in Example I was expanded 65 percent exactly as in Example I except that platens 4 were not heated, drum 6 was not heated, and the clutch torque on take-up roll 8 was increased so that the ribbon did not retract in passing from drum 7 to the take-up roll. Marks were made on the ribbon at 1 foot intervals as it passed from rolls 5 to drum 6. A marked length of this ribbon was removed from roll 8 and laid out on a smooth table along with a heat-treated length of 65 percent expanded material from Example I which had been similarly marked at 1 foot intervals. The retraction rate of the two ribbons was measured. The percent retraction was as follows:

TABLE II

|  | Immediate | % Retraction 3 min. | 20 min. | 60 min. |
|---|---|---|---|---|
| Example I Heat processed material | 0 | 0 | 0 | 1% |
| Example II Not heat processed | 17% | 20.5% | 23.5% | 24.5% |

When the unheated material of this example was slit to ½ inch widths and wound on cores, difficulty was encountered with the paper cores collapsing. Also, the rolls of tape would distort into a cup shape after standing a few hours. Strips of tape from these rolls distorted into a ruffled configuration when removed from the roll. It is not feasible to market a material packaged to a specified length if it retracts when removed from the roll. This difficulty is not encountered in this invention. For example, the process of Example I produces material satisfactory in this respect.

EXAMPLE III

In order to establish limits on the time-temperature of stress relief, strips of tape slit from the non-heat-treated, 65 percent expanded material of this example were placed in clamps holding them extended to their unretracted length and then placed between heated platens for various periods and with the platens at various temperatures. The cooled strips were then removed from the clamp and allowed to retract for 1 hour before measuring the retraction. Results were as follows:

TABLE III

| Temperature | Time (seconds) | % Retraction after 60 min. |
|---|---|---|
| 300° C. | 30 | 2.0 |
|  | 60 | 1.0 |
|  | 120 | <1.0 |
| 250° C. | 30 | 3.0 |
|  | 60 | 4.0 |
|  | 120 | 3.0 |
| 200° C. | 30 | 7.5 |
|  | 60 | 8.0 |
|  | 120 | 7.0 |
| 150° C. | 30 | 14.0 |
|  | 60 | 12.0 |
|  | 120 | 11.0 |
|  | 240 | 9.0 |
|  | 480 | 6.0 |

EXAMPLE IV

In order to explore the characteristics of unsintered poly(tetrafluoroethylene) tapes currently in commercial use, eight different brands of poly(tetrafluoroethylene) thread sealants were purchased on the open market. The properties of these were measured and are listed below in Table IV in comparison with the results shown in Example I, using the tests described above.

TABLE IV

|  | Thickness | Specific gravity | Coef. of friction | Self adhesion, gms./in.² | Conformability, percent | Lengthwise tensile st., p.s.i. | Lengthwise elongation, percent | Torque to seal, ft. lbs. |
|---|---|---|---|---|---|---|---|---|
| 1. Gore not expanded | .0031 | 1.49 | .29 | 33 | 12.6 | 1,525 | 115 | 17 |
| 2. Gore 18% expanded | .0031 | 1.29 | .91 | 42 | 16.0 | 1,360 | 83 | 14 |
| 3. Gore 30% expanded | .0031 | 1.17 | 1.09 | 110 | 19.1 | 1,340 | 84 | 21 |
| 4. Gore 65% expanded | .0030 | 0.93 | 1.34 | 175 | 29.2 | 1,340 | 97 | 20 |
| 5. "Pipe-Pac" | .0035 | 1.65 | .31 | 18 | 10.6 | 1,936 | 180 | 17 |
| 6. "Permacel" | .0030 | 1.61 | .35 | 8 | 9.2 | 2,160 | 177 | 12 |
| 7. 3M Scotch Brand | .0035 | 1.50 | .44 | 30 | 10.6 | 1,085 | 115 | 16 |
| 8. Chesterton "Gold End" | .0036 | 1.46 | .43 | <5.3 | 10.0 | 1,163 | 102 | 11 |
| 9. Ethylene Gulf Coast | .0024 | 1.46 | .41 | 24 | 14.0 | 2,222 | 85 | 21 |
| 10. American Packing & Gasket Co. | .0028 | 1.56 | .31 | <5.3 | 11.2 | 2,650 | 72 | 12 |
| 11. "Anklon" | .0036 | 1.46 | .30 | 22 | 10.0 | 1,412 | 67 | 10 |
| 12. "Crosslite" | .0031 | 1.53 | .31 | <5.3 | 11.2 | 3,200 | 120 | 20 |

Certain of these commercial products were too low in self-adhesion to lift the wooden block to which the sample was held. These are tabulated as less than 5.3 gms. which is the weight of the sample and the block.

It will be seen that none of the commercial products possesses the low density, high friction, high self-adhesion, or good thread conformability of the expanded poly(tetrafluoroethylene) tape of this invention.

From the above table, it can be seen that products of this invention have coefficients of friction above 0.5, prior art products having lower coefficients. Similarly, articles of this invention possess self-adhesion values in excess of about 35 grams/square inch, the conventional tapes having lower values. Also, the articles of this invention are superior in that they have percent conformabilities above 15 percent while the conventional materials are below that value. These are highly important assets of the products of this invention. Coupled with their economic value achieved by effecting lower densities the products of this invention are far superior to the conventional materials.

EXAMPLE V

Lengths of uniaxially fibrillated unsintered poly(tetrafluoroethylene) rod or beading circular in cross-section were marked with gauge marks 5 inches apart and stretched by hand to various degrees. After the stretch, the beading samples were allowed to relax for about 1 minute and the distance between the gauge marks then measured. The degree of elongation from the 5 inch gauge marks, the average diameter and the specific gravity were measured on these samples. The results are tabulated below:

TABLE V

| Material | Elongation | Avg. Diameter | Specific Gravity |
|---|---|---|---|
| 1/10" dia. beading | none | .0962" | 1.57 |
|  | 10% | .0956" | 1.45 |
|  | 20% | .0954" | 1.33 |
|  | 40% | .09449" | 1.15 |
| 1/4" dia. beading | none | .2634" | 1.60 |
|  | 10% | .2608" | 1.48 |
|  | 20% | .2603" | 1.36 |
|  | 40% | .2603" | 1.17 |

One of the 1/10 inch diameter samples was stretched to where the gauge marks were 7.5 inches apart, held extended to that length while placed in an oven at 300° C. for 10 minutes. When this sample was released from the clamps, no measurable retraction of the length between the gauge marks could be found.

This example demonstrates that the expansion process can be applied to essentially any geometry where the shape provides a uniform cross-section along one axis.

It is surprising that unsintered poly(tetrafluoroethylene) ribbons can be expanded by stretching them. It is well known that plastic ribbons usually narrow and usually become thinner when they are stretched and no change in density occurs. Also, the improvements in higher coefficient of friction, better self-adhesion, and better conformability to thread profiles are unexpected and not predictable from known characteristics of polymers.

It is also surprising that expanded poly(tetrafluoroethylene) ribbons can be stress-relieved by very short heating periods at substantially lower temperatures than the melting point of 342° C. Further, it is surprising that little or no decrease in thickness or width of the ribbon occurs during the stress decay.

The results of extensive sealing tests with a number of types of threads support the concept that only the volume of poly(tetrafluoroethylene) inserted in the interstices between mating threads is important to the quality of the seal, and that the density of the sealing strip is not a factor. However, with fine threads it has been demonstrated conclusively that the expanded material is much easier to use because of its conformability and possibly because of its greater compressability.

A number of "blind" tests were made with different persons to compare the ease of wrapping expanded versus nonexpanded poly(tetrafluoroethylene) strips around threads in a cold box at −40° F. In every trial the expanded material was chosen as being much easier to wrap and adhere. Similar blind trials at room temperature have without exception favored the expanded material.

Efforts have been made to expand unsintered poly(tetrafluoroethylene) by other methods. One of these is to increase the lubricant content of the extrusion composition. However, this can be done only to a limited extent because the excess lubricant is squeezed out during the extrusion and also fibrillation is reduced below that necessary to produce a coherent ribbon. Specific gravity below about 1.40 seems unattainable by this route. Trials have also been made to expand the sheet by bringing a sheet with the interstices filled with a low boiling fluid (e.g. trichloroethylene) into contact with a hot plate well above the boiling temperature of the fluid. Although the hope had been that the sudden volatilization of the fluid would expand the sheet, this did not happen and no reduction in specific gravity was obtained.

While this invention has been described starting with a shaped article such as a tape or ribbon or sheet, it is possible to start with the powdered polymeric material and shape such an article in the usual fashion passing directly to the process of this invention. The initially produced tape requires no special handling or treatment prior to its being processed in this invention. Thus, the conventional methods for making tapes and the like which produce standard or conventional shaped articles can be used here passing the said articles directly to apparatus of this invention or its equivalent.

Similarly, polymers of tetrafluoroethylene that can be used include the various commercially available polymers such as poly(tetrafluoroethylene) and copolymers of tetrafluoroethylene. For example, "Teflon" 6C powder is a commercially available copolymer of tetrafluoroethylene which has been used in the process of this invention to produce the novel expanded sheetings of this invention. Such copolymers may contain small amounts, generally in the range of about 1 percent to about 5 percent, of ethylene or chlorotrifluoroethylene or fluorinated propylene such as hexafluoropropylene. Since poly(tetrafluoroethylene) is the material mainly used in sealing threaded joints, it is a preferred polymer of this invention although the aforesaid copolymers and similar copolymers may be used extensively, if desired.

In addition to the improvements in the properties of poly(tetrafluoroethylene) for sealing threaded joints, the reduced specific gravity of the expanded material makes it possible to produce high quality seals with less of the expensive poly(tetrafluoroethylene) resin. This is obviously of great commercial importance. It is estimated that approximately 1,000,000 pounds of poly(tetrafluoroethylene) will be used for sealing threaded joints during 1970. The products of this invention can substantially reduce the need for this expensive material. In addition to thread seals, the expanded material of this invention is also useful in packings and seals generally. Valve stem packings, pump packings and pipe flange gaskets are examples of these. Compression seals are readily and effectively formed using this invention.

Although the expansion process has been described as applied to thin ribbons of unsintered poly(tetrafluoroethylene), the same process can be used to expand square or rectangular rods or other shapes of uniform cross-section, and articles of various thicknesses, lengths and widths can be readily processed by this invention.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:

1. A shaped article of an unsintered tetrafluoroethylene polymer which is uniaxially expanded and oriented, has a fibrillated structure and has a specific gravity of less than 1.4.

2. A shaped article in accordance with claim 1 in which said polymer is poly(tetrafluoroethylene).

3. A shaped article in accordance with claim 1 in which said polymer is a tetrafluoroethylene/hexafluoropropylene copolymer.

4. A shaped article in accordance with claim 1 which is in ribbon form and has a coefficient of friction above about 0.5.

5. A shaped article in accordance with claim 1 which is in ribbon form and has a self-adhesion value above about 35 grams/square inch.

6. A shaped article in accordance with claim 1 which is in ribbon form and has a percent conformability value above about 15 percent.

7. A shaped article in accordance with claim 1 which is in the form of a pellicle.

8. A shaped article in accordance with claim 1 which is in the form of a rod.

9. A shaped article in accordance with claim 1 which does not retract along its length at normal temperatures.

* * * * *